(12) United States Patent
Park (10) Patent No.: US 7,679,693 B2
(45) Date of Patent: Mar. 16, 2010

(54) LIQUID CRYSTAL DISPLAY DEVICE AND MANUFACTURING METHOD THEREOF

(75) Inventor: Seung Ryull Park, Anyang-si (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 12/289,796

(22) Filed: Nov. 4, 2008

(65) Prior Publication Data
US 2009/0141205 A1    Jun. 4, 2009

Related U.S. Application Data

(62) Division of application No. 11/166,198, filed on Jun. 27, 2005, now Pat. No. 7,456,909.

(30) Foreign Application Priority Data
Jul. 30, 2004    (KR) .................. 10-2004-0060527
Feb. 21, 2005    (KR) .................. 10-2005-0014261

(51) Int. Cl.
*G02F 1/1333*    (2006.01)

(52) U.S. Cl. .................. 349/40; 349/155; 349/156; 349/157

(58) Field of Classification Search .................. None
See application file for complete search history.

(56) References Cited

U.S. PATENT DOCUMENTS 6,061,105 A * 5/2000 Nakagawa .................. 349/40

* cited by examiner

*Primary Examiner*—Richard H Kim
(74) *Attorney, Agent, or Firm*—McKenna Long & Aldridge (57) ABSTRACT

Provided is an LCD having a liquid crystal panel including an active region serving as a display region and an outer region serving as a non-display region. The LCD includes a first substrate including an array unit and a color filter formed in the active region, an ESD (electrostatic discharge) circuit formed in the outer region, a pattern spacer formed on the ESD, a second substrate facing the first substrate, and a sealant for attaching the first and second substrates together.

22 Claims, 8 Drawing Sheets

LIQUID CRYSTAL DISPLAY DEVICE AND MANUFACTURING METHOD THEREOF

CROSS-REFERENCE TO RELATED APPLICATIONS

This application is a Divisional of application Ser. No. 11/166,198, filed Jun. 27, 2005, now U.S. Pat. No. 7,456,909 now allowed; which claims priority to Korean Patent Application Nos. 10-2004-0060527, filed Jul. 30, 2004, and 10-2005-0014261, filed Feb. 21, 2005, all of which are hereby incorporated by their reference as if fully set forth herein.

This application claims the benefit of Korean Patent Application Nos. 2004-60527, filed Jul. 30, 2004, and 2005-14261, filed Feb. 21, 2005, which are hereby incorporated by reference for all purposes as if fully set forth herein.

BACKGROUND OF THE INVENTION

1. Field of the Invention

The present invention relates to a liquid crystal display device, and more particularly, to a liquid crystal display device preventing damage in an electrostatic discharge circuit and a manufacturing method thereof.

2. Discussion of the Related Art

The growth of the information technology and consumer electronics industries has driven the need for a next generation display device capable of processing and displaying the large capacity image information increases gradually.

Such next generation display devices are required to be lighter, thinner, shorter and smaller characteristics, a high luminance, a large-sized screen, low power consumption and a low price. Examples of next generation display devices include a liquid crystal display device (LCD), a plasma display panel (PDP), an electro luminescent display (ELD), and a vacuum fluorescent display (VFD). Among them, the LCD is the most widespread.

The LCD exhibits superior resolution compared to other flat displays, and a fast response rate comparable to that of the CRT in implementing a moving picture.

The LCD is widely used in various technology fields such as PC monitors, notebook computer monitors, TV receivers, vehicle-mounted TV receivers, navigation devices, and the like because it has high brightness and contrast and low power consumption.

Structurally, in the LCD, two substrates are arranged facing each other. Electrodes are respectively formed on facing surfaces of the two substrates. Liquid crystal is injected into a gap between the two substrates. An alignment state of the liquid crystal is changed by an electric field that is generated by a voltage applied to the electrodes. Accordingly, a light transmittance is varied and thus an image is displayed.

The LCD includes a liquid crystal panel for displaying an image and a driving unit for applying a driving signal to the liquid crystal panel. The liquid crystal panel includes first and second substrates attached together with a predetermined gap therebetween, and a liquid crystal layer injected into the gap between the first and second substrates.

The first substrate includes thereon a plurality of gate lines arranged in one direction to be spaced apart from each other by a predetermined distance, a plurality of data lines arranged perpendicular to the gate lines to be spaced apart from each other by a predetermined gap, a plurality of pixel electrodes formed in a matrix pattern in respective pixel regions defined by the gate lines and the data lines, and a plurality of thin film transistors (TFTs) that are switched by signals of the gate lines to transmit signals of the data lines to the respective pixel electrodes.

The second substrate includes thereon a black matrix layer for blocking light from regions other than the pixel regions, a color filter layer for representing color, and a common electrode for reproducing an image.

When the color filter is formed on an array substrate (that is, the first layer) including the TFTs, production yield and attachment margin can be improved.

A color filter on TFT (COT)-type LCD and a TFT on color filter (TOC)-type LCD in which a TFT and a color filter are formed on the same substrate will now be described.

Figure 1:
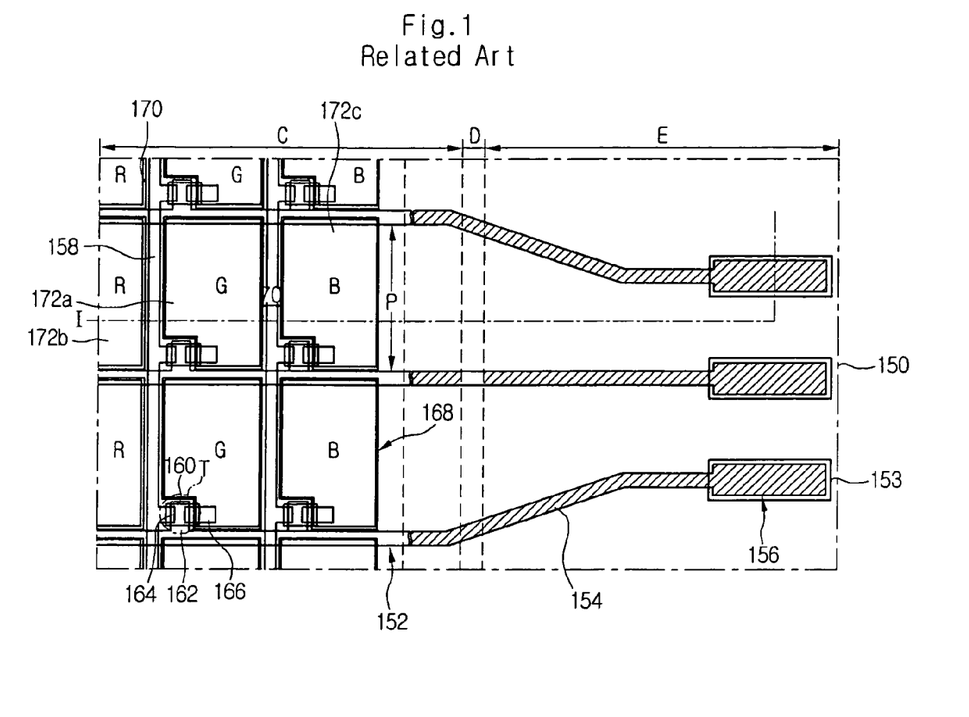
FIG. 1 is a plan view illustrating a part of an array substrate for a related art COT-type LCD.

FIG. 1 is a plan view illustrating a part of an array substrate for a related art COT-type LCD.

Referring to FIG. 1, a plurality of gate lines 152 are arranged in one direction on a substrate 150. A gate link line 154 is connected to one end of the gate line 152 and a gate pad 156 is connected to the gate link line 154. A plurality of data lines 158 are arranged perpendicular to the gate lines 152 to define a plurality of pixel regions P. A data link line (not shown) is connected to one end of the data line 158 and a data pad (now shown) is connected to the data link line.

An island-shaped gate pad port 153 is provided at the gate pad 156. The gate pad port 153 is connected to an external driving circuit to directly receive a driving signal therefrom.

A TFT T is formed at an intersection between the gate line 152 and the data line 158. The TFT T includes a gate electrode 160, an active layer 162, and source/drain electrodes 164 and 166.

A transparent pixel electrode 168 is formed in the pixel region P defined by the gate and data lines 152 and 158.

A black matrix 170 is formed on the TFT T, the gate line 152 and the data line 158. R/G/B color filters 171a, 172b and 172c are sequentially formed on the pixel electrodes 168.

In the above structure, the gate link line 154 and the gate pad 156 constitute a non-display region E and a TFT array region corresponds to a display region C. In the related art, light leakage occurs at a boundary region D between the non-display region E and the display region C.

Figure 2:
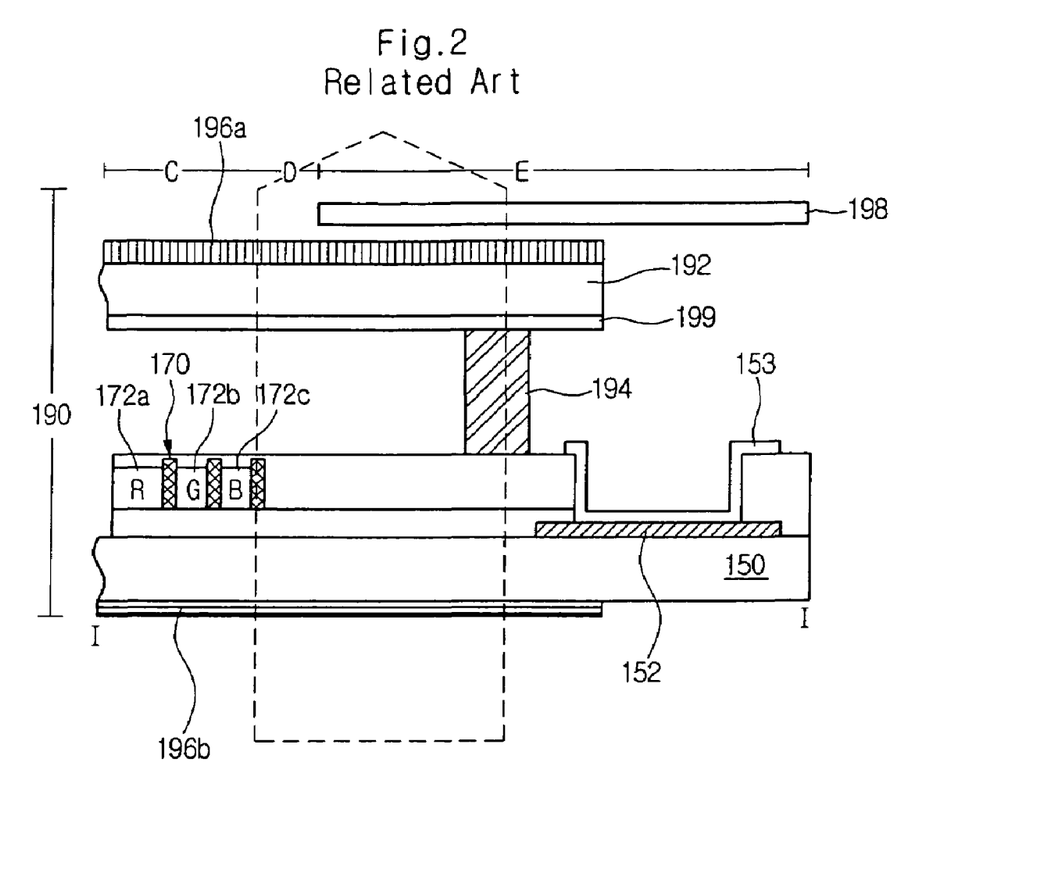
FIG. 2 is an enlarged sectional view of a side taken along line I-I' in FIG. 1.

FIG. 2 is an enlarged sectional view of a side taken along line I-I' in FIG. 1. FIG. 2 illustrates an outer portion of the related art COT-type LCD.

Referring to FIG. 2, a COT-type LCD 190 includes first and second substrates 150 and 192 facing each other. The first and second substrates 150 and 192 are attached together using a sealant 194. A gate pad 152 and a gate pad port 153 connected thereto are exposed outside the sealant 194.

A polarization plate 196a is formed on an outside surface of the second substrate 192 and a polarization plate 196b is formed on an outside surface of the first substrate 150. Here, the polarization plate 196a has a polarization axis perpendicular to that of the polarization plate 196b. A top cover 198 is formed to cover around the peripheries of the first and second substrates 150 and 192.

The first substrate 150 includes thereon a TFT array region (not shown), color filters 172a, 172b and 172c formed on the TFT array region, and a black matrix 170 formed on the color filters. The second substrate 192 includes thereon a transparent electrode 199.

In the COT-type LCD 190, there occurs light leakage at the boundary region D between the non-display region E and the display region C, resulting in the degradation of an image quality.

To prevent this light leakage, the black matrix 170 must be formed also on the outer portion of the display panel as well as on the TFT region.

However, when the black matrix 170 is formed also on the second substrate 192 facing the first substrate 150, a second overcoat layer must also be formed on the black matrix 192 in order to reduce the step difference of the black matrix 170.

The second overcoat layer formed on the black matrix causes an undesirable increase in both the thickness of the LCD and its production cost.

Also, when an electrostatic discharge (ESD) circuit is formed at an end of an array portion in the first substrate, a contact hole must formed on the black matrix of the outer portion.

When the contact hole is formed on the black matrix, the material of the black matrix is transferred into the contact hole and thus an undesired organic layer is formed therein. Consequently, the manufacturing process becomes unstable and the quality or characteristic of the contact between the contact hole and the pixel electrode degrades.

SUMMARY OF THE INVENTION

Accordingly, the present invention is directed to a liquid crystal display device and a manufacturing method thereof that substantially obviate one or more problems due to limitations and disadvantages of the related art.

An advantage of the present invention is to provide a liquid crystal display device and a manufacturing method thereof, in which an array unit and a color filter layer is formed on one substrate, a black matrix is also formed on the substrate, and a pattern spacer is disposed at an ESD circuit at the outer portion thereof, thereby protecting the ESD circuit and preventing an electrical short due to an electrostatic discharge.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided an LCD having a liquid crystal panel including an active region serving as a display region and an outer region serving as a non-display region, the LCD including: a first substrate including an array unit and a color filter formed in the active region; an ESD circuit formed in the outer region; a pattern spacer formed on the ESD; a second substrate facing the first substrate; and a sealant for attaching the first and second substrates together.

In another aspect of the present invention, there is provided a method for manufacturing an LCD, the method including: forming an array unit, a color filter and a black matrix in a display region on a first substrate and forming an ESD circuit and an outer black matrix in a non-display region; forming a pattern spacer in the display region and forming a pattern spacer on a partial surface or an entire surface of the ESD circuit; attaching the first substrate and a second substrate facing the first substrate together using a sealant; and forming a liquid crystal layer between the first and second substrates.

In a further another aspect of the present invention, there is provided an LCD having a liquid crystal panel including an active region serving as a display region and an outer region serving as a non-display region, the LCD including: a gate line formed in one direction on a first substrate; a gate electrode formed on the first substrate; a gate pad formed at the outer region; a gate insulating layer formed on the gate line; a semiconductor layer formed on the gate insulating layer at a position corresponding to a TFT; a data line intersected by the gate line to define a pixel region; source and drain electrodes protruded from the semiconductor layer; a black matrix formed on the TFT, the gate line and the data line; a color filter formed in the pixel region; an overcoat layer formed on the black matrix and the color filter; a pixel electrode formed on the overcoat layer to be connected to the drain electrode; a transparent common electrode formed to alternate with the pixel electrode; an ESD circuit formed in the outer region; a pattern spacer formed on the ESD, the TFT and the gate pad; a second substrate facing the first substrate; and a sealant for attaching the first and second substrates together.

In a still further another aspect of the present invention, there is provided a method for manufacturing an LCD having a liquid crystal panel including an active region serving as a display region and an outer region serving as a non-display region, the method including: forming in the active region on a first substrate a gate line, a gate pad, and a data line intersecting the gate line to define a pixel region and forming a TFT at an intersection between the gate line and the data line, the TFT including a gate electrode and an active layer and source/drain electrodes; forming an ESD circuit in an outer region of the first substrate; forming a black matrix on the TFT, the gate line, the data line and the outer region; forming an R/G/B color filter in the pixel region; forming an overcoat layer on the color filter; forming a pixel electrode and a transparent common electrode on the overcoat layer; forming a pattern spacer on the ESD circuit and the gate pad; attaching the first substrate and a second substrate facing the first substrate together using a sealant; and forming a liquid crystal layer between the first and second substrates.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE ILLUSTRATED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 3:
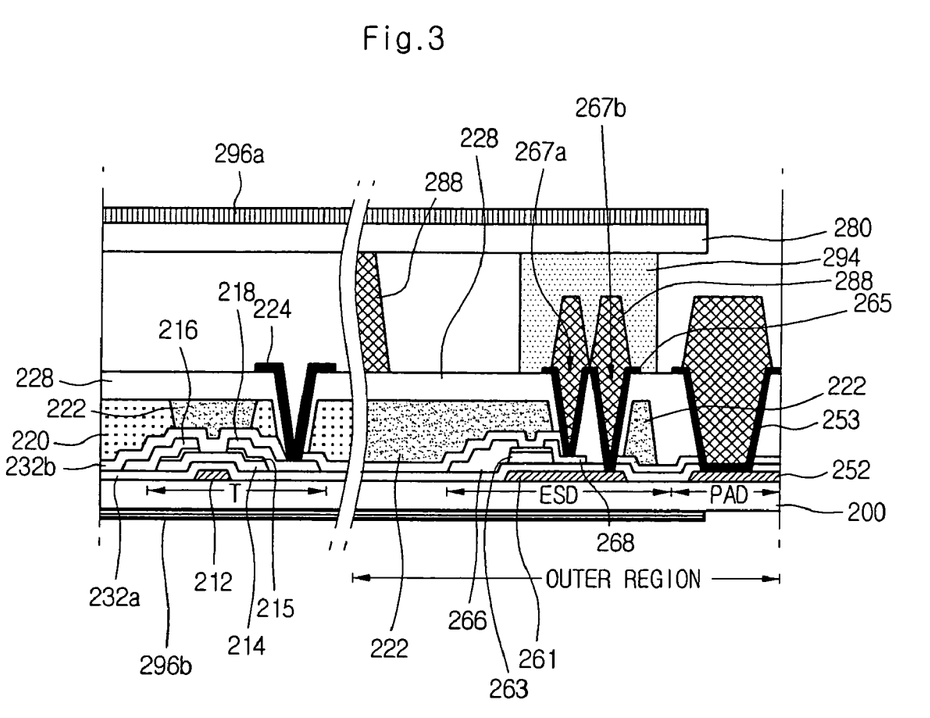
FIG. 3 is a sectional view of a COT-type LCD according to a first embodiment of the present invention.

FIG. 3 is a sectional view of a COT-type LCD according to a first embodiment of the present invention.

Referring to FIG. 3, the COT-type LCD includes a first substrate 200. A gate electrode 212 is formed on the first substrate 200 and a gate insulating layer 232a is formed on the gate electrode 212.

A gate pad is formed at an end of a gate line connected to the gate electrode 212.

An active layer 214 and an ohmic contact layer 215 are sequentially stacked on the gate insulating layer 232a corresponding to the gate electrode 212. Source and drain electrodes 216 and 218 are formed on the ohmic contact layer 215 to contact with the ohmic contact layer 215 and to be spaced part from each other by a predetermined distance.

A first overcoat layer 232b for protecting the active layer 214 is formed of inorganic material on an entire surface of the first substrate 200 on which the source and drain electrodes 216 and 218 have been formed.

A color filter 220 contacting with the drain electrode 218 is formed on the gate insulating layer 232a corresponding to a pixel region.

A black matrix 222 is formed on a TFT T.

A second overcoat layer 228 is further formed on an entire surface of the first substrate 200 on which the color filter 220 and the black matrix 222 have been formed.

A pixel electrode 224 contacting with the drain electrode 218 and corresponding to the pixel region is formed on the second overcoat layer 228.

Another black matrix 222 may be simultaneously formed in an outer portion of the first substrate 200, that is, a light leakage region corresponding to the gate link line, while the black matrix 222 and the color filter 220 are formed.

A second overcoat layer 228 is simultaneously formed on a black matrix at the outer portion while the second overcoat layer 228 is formed on the black matrix 222 and the color filter 220.

The first overcoat layer 232b and the gate insulating layer 232a are etched so that the drain electrode 218 may come in contact with the pixel electrode 224.

An ESD circuit is formed at the outer portion of the first substrate 200.

The ESD circuit includes a predetermined number of TFTs and makes an electrical connection of lines in the panel when static electricity is generated, thereby preventing the lines from being electrically shorted.

The ESD circuit includes a gate electrode 261 at the outer portion of the first substrate 200, a gate insulating layer 232a on the gate electrode 261, a semiconductor layer 263 on the gate insulating layer 232a, and source and drain electrodes 266 and 268 spaced apart from each other on the semiconductor layer 263. Pixel electrode patterns 265 are formed respectively in a drain electrode contact hole 167 and a gate electrode contact hole 267b and electrically connected to each other.

A pattern spacer 288 is formed on the ESD circuit.

The first substrate 200 is attached to a second substrate 280 by a sealant 294, and a gate pad 252 and a gate pad port 253 connected thereto are exposed outside the sealant 294.

A polarization plate 296a is formed on an outside surface of the second substrate 280 and a polarization plate 296b is formed on an outside surface of the first substrate 200. Here, the polarization plate 296a has a polarization axis perpendicular to that of the polarization plate 296b. A top cover is formed to cover around the peripheries of the first and second substrates 200 and 280.

The top cover is preferably formed to overlap the sealant 294 so as to prevent light leakage.

In this manner, the black matrix 222 is formed at an outer portion of the panel to prevent light leakage at the outer portion, and the ESD circuit is disposed outwardly from the black matrix 222.

The pattern spacer 288 is formed on the ESD circuit to protect the ESD circuit.

Here, the ESD circuit may be formed under the sealant 294, or may be formed inwardly or outwardly from the sealant 294.

This structure makes it possible to protect the ESD circuit and prevent an electrical short due to static electricity generated.

Also, the pattern spacer 288 is formed on the gate pad 252 formed outwardly from the sealant 294.

This aims at preventing a galvanic phenomenon from occurring between the gate pad 252 and the gate pad port 23.

Figure 4:
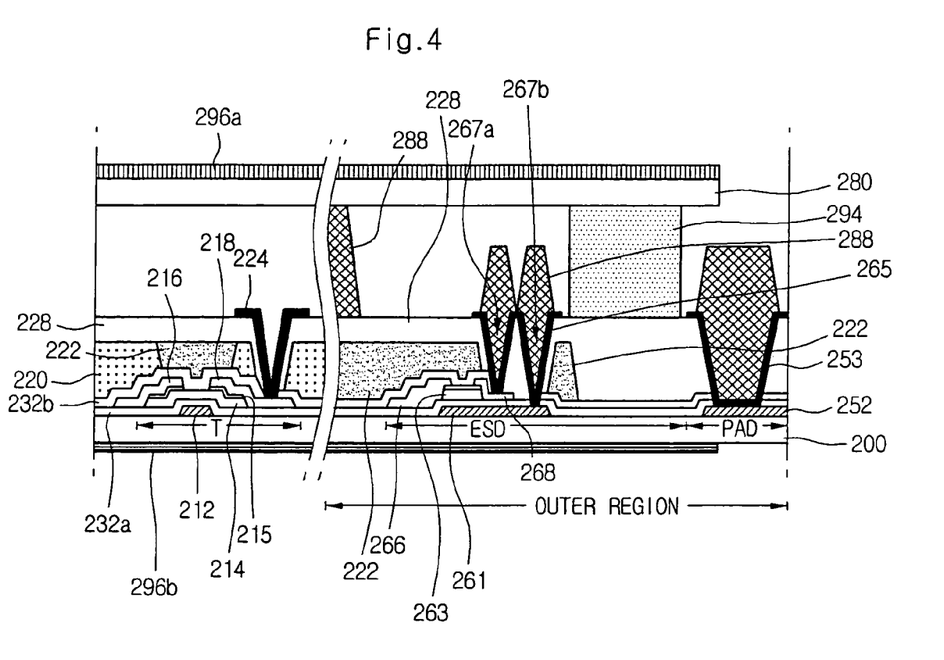
FIG. 4 is a sectional view of a COT-type LCD according to a second embodiment of the present invention.

FIG. 4 is a sectional view of a COT-type LCD according to a second embodiment of the present invention.

In this embodiment, a detailed description about the same elements as in FIG. 3 will be omitted for simplicity.

Referring to FIG. 4, an ESD circuit is formed at an outer portion of the panel and a pattern spacer is formed on the ESD circuit.

Here, the ESD circuit is formed inwardly from the sealant 294.

In addition, the ESD circuit may be formed between the sealant 294 and a black matrix 222 formed at the outer portion.

Figure 5:
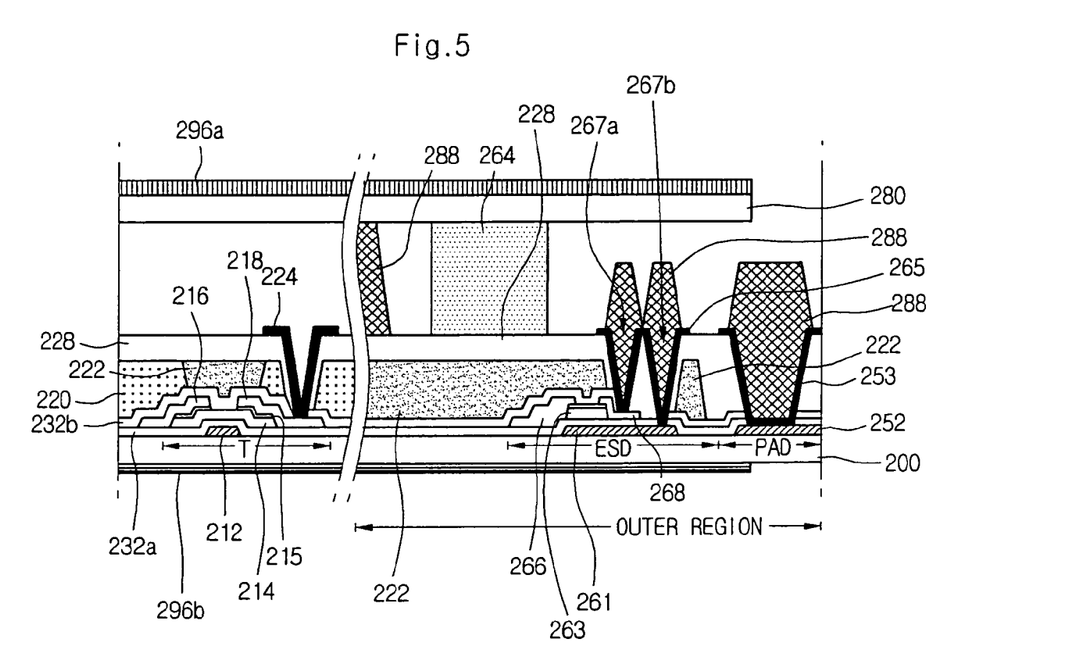
FIG. 5 is a sectional view of a COT-type LCD according to a third embodiment of the present invention.

FIG. 5 is a sectional view of a COT-type LCD according to a third embodiment of the present invention.

In this embodiment, a detailed description about the same elements as in FIG. 3 will be omitted for simplicity.

Referring to FIG. 5, an ESD circuit is formed at an outer portion of the panel and a pattern spacer 288 is formed on the ESD circuit.

Here, the ESD circuit is formed outwardly from a sealant 264.

In addition, the ESD circuit may be formed between the sealant 264 and a gate pad 252.

When the ESD circuit is formed outwardly from the sealant 264 and the pattern spacer 288 is formed on the ESD circuit, the electro-chemical corrosion of the ESD circuit can be prevented.

The LCD described in these embodiments is manufactured through a 5-mask process.

The abovementioned structure can be similarly applied to a TOC-type LCD.

Also, the abovementioned structure can be similarly applied to an LCD manufactured through a 4-mask process.

Furthermore, the abovementioned structure can be similarly applied to an IPS-mode LCD.

Figure 6:
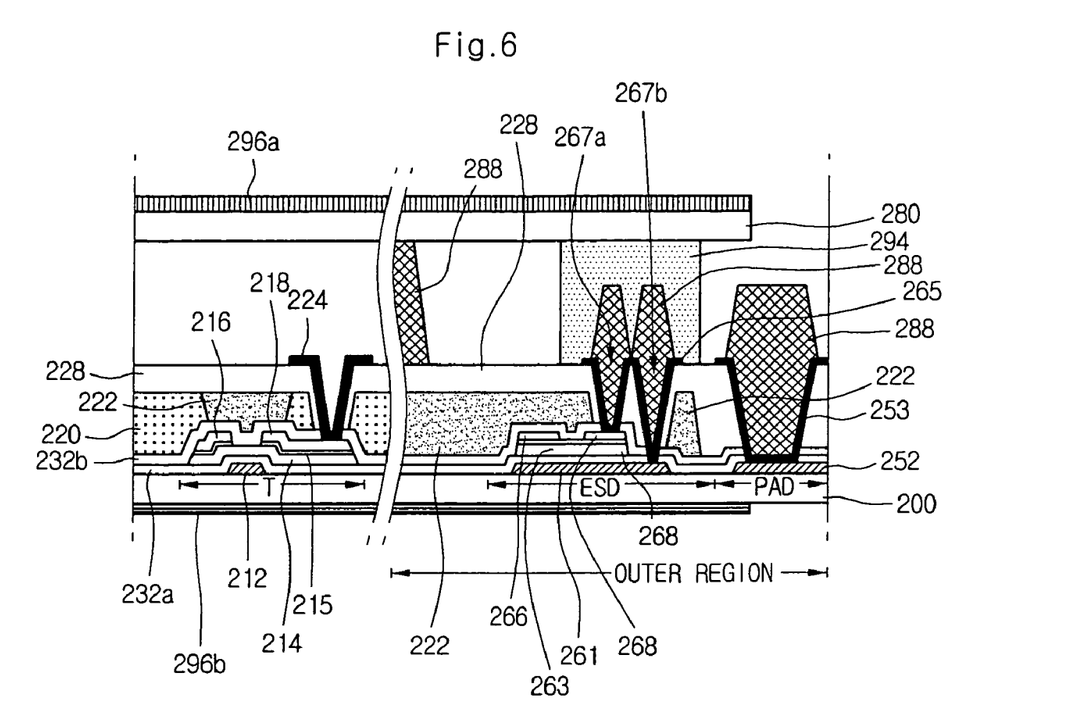
FIG. 6 is a sectional view of a COT-type LCD manufactured through a 4-mask process according to a fourth embodiment of the present invention.

FIG. 6 is a sectional view of a COT-type LCD manufactured through a 4-mask process according to a fourth embodiment of the present invention.

Referring to FIG. 6, in a first mask process, a gate electrode 212 is formed on a first substrate 200 and a gate insulating layer 232a is formed on the gate electrode 212.

Thereafter, a gate pad is formed at an end of a gate line connected to the gate electrode 212.

In a second mask process, an active matrix material, an ohmic contact layer material, and source and drain electrode material are sequentially stacked on the gate insulating layer 232a. Thereafter, through a diffractive exposure, an active layer 214 and an ohmic contact layer 215 are sequentially stacked on the gate insulating layer 232a corresponding to the gate electrode 212 and source and drain electrodes 216 and 218 are formed on the ohmic contact layer 215 to contact with the ohmic contact layer 215 and to be spaced part from each other by a predetermined distance.

A first overcoat layer 232b for protecting the active layer 214 is formed of inorganic material (such as SiNx) on an entire surface of the first substrate 200 on which the source and drain electrodes 216 and 218 have been formed. Here, the first overcoat layer 232b may be omitted.

Next, a black matrix 222 for preventing light leakage is formed on a TFT T, an outer region of the panel, and an ESD circuit.

Thereafter, a color filter 220 is formed on the first overcoat layer 232b in such a way to correspond to a pixel region.

A second overcoat layer 228 is further formed on an entire surface of the first substrate 200 on which the color filter 220 and the black matrix 222 have been formed.

The second overcoat layer 228 may be made of an inorganic insulating material such as SiNx or may be made of an organic insulating material such as photo acryl.

In addition, photo acryl is used to overcome the step difference between the color filter and the black matrix and to obtain permittivity. Because the step difference is reduced with an increase in the thickness of color filter resin for excellent color reproduction and the permittivity of the black matrix material is obtained, an SiNx layer with a thin thickness can be used.

In a third mask process, a contact hole is formed to penetrate the first and second overcoat layers 232b and 228.

In a fourth mask process, a pixel electrode 224 contacting with the drain electrode 218 through the contact hole and corresponding to the pixel region is formed on the second overcoat layer 228.

In addition, another black matrix 222 may be simultaneously formed in an outer portion of the first substrate 200, that is, a light leakage region corresponding to the gate link line, while the black matrix 222 and the color filter 220 are formed.

A second overcoat layer 228 is simultaneously formed on a black matrix at the outer portion while the second overcoat layer 228 is formed on the black matrix 222 and the color filter 220.

The first overcoat layer 232b and the gate insulating layer 232a are etched so that the drain electrode 218 may come in contact with the pixel electrode 224.

An ESD circuit is formed at the outer portion of the first substrate 200.

The ESD circuit includes a predetermined number of TFTs and makes an electrical connection of lines in the panel when static electricity is generated, thereby preventing the lines from being electrically shorted.

The ESD circuit includes a gate electrode 261 at the outer portion of the first substrate 200, a gate insulating layer 232a on the gate electrode 261, a semiconductor layer 263 on the gate insulating layer 232a, and source and drain electrodes 266 and 268 spaced apart from each other on the semiconductor layer 263. Pixel electrode patterns 265 are formed respectively in a drain electrode contact hole 167 and a gate electrode contact hole 267b and electrically connected to each other.

A pattern spacer 288 is formed on the ESD circuit.

The first substrate 200 is attached to a second substrate 280 by a sealant 294, and a gate pad 252 and a gate pad port 253 connected thereto are exposed outside the sealant 294.

A polarization plate 296a is formed on an outside surface of the second substrate 280 and a polarization plate 296b is formed on an outside surface of the first substrate 200. Here, the polarization plate 296a has a polarization axis perpendicular to that of the polarization plate 296b. A top cover is formed to cover around the peripheries of the first and second substrates 200 and 280.

The top cover is preferably formed to overlap the sealant 294 so as to prevent light leakage.

In this manner, the black matrix 222 is formed at an outer portion of the panel to prevent light leakage at the outer portion, and the ESD circuit is disposed outwardly from the black matrix 222.

The pattern spacer 288 is formed on the ESD circuit to protect the ESD circuit.

Here, the ESD circuit may be formed under the sealant 294, or may be formed inwardly or outwardly from the sealant 294.

This structure makes it possible to protect the ESD circuit and prevent an electrical short due to static electricity generated.

Also, the pattern spacer 288 is formed on the gate pad 252 formed outwardly from the sealant 294.

This aims at preventing a galvanic phenomenon from occurring between the gate pad 252 and the gate pad port 253.

Here, a detailed description about the same elements as in FIGS. 3 to 6 was omitted for conciseness.

Figure 7:
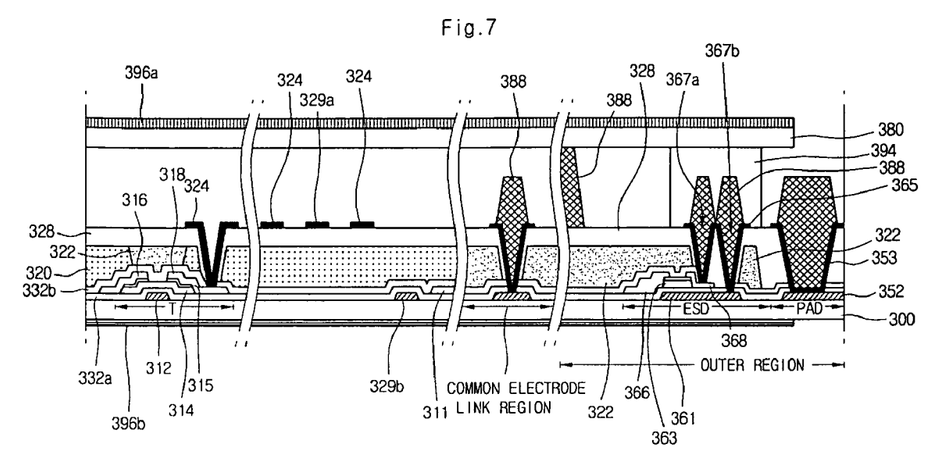
FIG. 7 is a sectional view of a COT-type IPS-mode LCD according to a fifth embodiment of the present invention.

FIG. 7 is a sectional view of a COT-type IPS-mode LCD manufactured through a 5-mask process according to a fifth embodiment of the present invention.

Referring to FIG. 7, a gate electrode 312 and a common electrode are formed on a first substrate 300 and a gate insulating layer 332a is formed on the gate electrode 312.

Thereafter, a gate pad 352 is formed at an end of a gate line connected to the gate electrode 312.

Thereafter, an active layer 314 and an ohmic contact layer 315 are sequentially stacked on the gate insulating layer 332a corresponding to the gate electrode 312.

Thereafter, a data line 311 is formed to interest the gate line. A source electrode 316 is formed to be protruded form the data line 311 to the active layer 314 and a drain electrode 318 is formed to be spaced apart from the source electrode 316 by a predetermined distance.

In addition, the source and drain electrodes 316 and 318 contact with the ohmic contact layer 315. The ohmic contact layer 315 is removed so that the active layer 314 may be exposed and thus a channel may be formed.

A first overcoat layer 332b for protecting the active layer 314 is formed of inorganic material (such as SiNx) on an entire surface of the first substrate 300 on which the source and drain electrodes 316 and 318 have been formed. Here, the first overcoat layer 332b may be omitted.

Next, a black matrix 322 for preventing light leakage is formed on a TFT T, an outer region of the panel, and an ESD circuit.

Thereafter, a color filter 320 is formed on the first overcoat layer 332b in such a way to correspond to a pixel region.

A second overcoat layer 328 is further formed on an entire surface of the first substrate 300 on which the color filter 320 and the black matrix 322 have been formed.

The second overcoat layer 328 may be made of an inorganic insulating material such as SiNx or may be made of an organic insulating material such as photo acryl.

In addition, photo acryl is used to overcome the step difference between the color filter and the black matrix and to obtain permittivity. Because the step difference is reduced with an increase in the thickness of color filter resin for excellent color reproduction and the permittivity of the black matrix material is obtained, an SiNx layer with a thin thickness can be used.

Meanwhile, a contact hole is formed to penetrate the first and second overcoat layers 332b and 328.

Next, a pixel electrode 324 contacting with the drain electrode 318 through the contact hole and corresponding to the pixel region is formed on the second overcoat layer 328.

In addition, another black matrix 222 may be simultaneously formed in an outer portion of the first substrate 200, that is, a light leakage region corresponding to the gate link line, while the black matrix 222 and the color filter 220 are formed.

Thereafter, a comb-shaped transparent common electrode 329a is formed to intersect the pixel electrode 324.

Meanwhile, the transparent common electrode 329a and a common electrode 329b simultaneously receive a common signal from a common voltage supply line (not shown) disposed at the outer portion of the panel through a common electrode link.

A second overcoat layer 328 may be simultaneously formed on a black matrix at the outer portion while the second overcoat layer 328 is formed on the black matrix 322 and the color filter 320.

The first overcoat layer 332b and the gate insulating layer 332a are etched so that the drain electrode 318 may come in contact with the pixel electrode 324.

An ESD circuit is formed at the outer portion of the first substrate 300.

The pattern spacer 388 is formed on the ESD circuit to protect the ESD circuit.

Here, the ESD circuit may be formed under the sealant 394, or may be formed inwardly or outwardly from the sealant 394.

Also, the pattern spacer 388 is formed on the gate pad 352 formed outwardly from the sealant 394.

This aims at preventing a galvanic phenomenon from occurring between the gate pad 352 and the gate pad port 353.

The pattern spacer 388 may also be formed on the common electrode link to prevent a galvanic phenomenon thereat.

Figure 8:
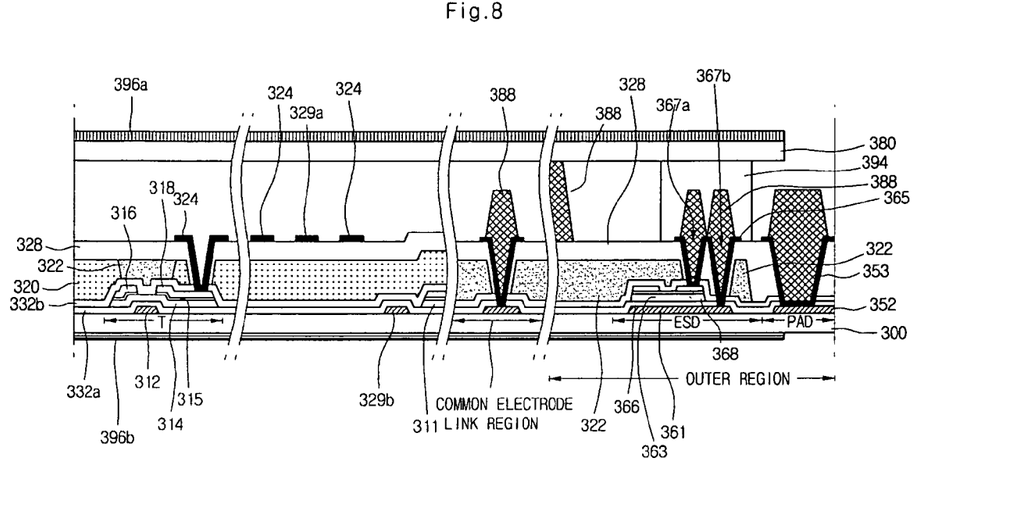
FIG. 8 is a sectional view of a COT-type IPS-mode LCD according to a sixth embodiment of the present invention.

FIG. 8 is a sectional view of a COT-type IPS-mode LCD manufactured through a 5-mask process according to a sixth embodiment of the present invention.

Here, a detailed description about the same elements as in FIGS. 3 to 7 will be omitted for conciseness.

Referring to FIG. 8, in a first mask process, a gate electrode 312 and a common electrode are formed on a first substrate 300 and a gate insulating layer 332a is formed on the gate electrode 312.

Thereafter, a gate pad 352 is formed at an end of a gate line connected to the gate electrode 312.

In a second mask process, an active layer 314, an ohmic contact layer 315 and a data line 311 are simultaneously formed. In detail, an active matrix material, an ohmic contact layer material, and source and drain electrode material are sequentially stacked on the gate insulating layer 232a. Thereafter, through a diffractive exposure, a data line 311 and source/drain electrodes 316 and 318 protruded from the data line 311 are formed and an active layer 314 and an ohmic contact layer 315 are formed beneath the source/drain electrodes 316 and 318.

That is, the active layer 314 and the ohmic contact layer 315 are formed on the gate insulating layer 332a corresponding to the gate electrode 312 and source and drain electrodes 316 and 318 are formed on the ohmic contact layer 315 to contact with the ohmic contact layer 315 and to be spaced part from each other by a predetermined distance.

Accordingly, the active layer 314 and the ohmic contact layer 315 are additionally formed beneath the data line 311, and the source and drain electrodes 316 and 318 contact with the ohmic contact layer 315. The ohmic contact layer 315 is removed so that the active layer 314 may be exposed and thus a channel may be formed.

A first overcoat layer 332b for protecting the active layer 314 is formed of inorganic material (such as SiNx) on an entire surface of the first substrate 300 on which the source and drain electrodes 316 and 318 have been formed. Here, the first overcoat layer 332b may be omitted.

Next, a black matrix 322 for preventing light leakage is formed on a TFT T, an outer region of the panel, and an ESD circuit.

Thereafter, a color filter 320 is formed on the first overcoat layer 332b in such a way to correspond to a pixel region.

A second overcoat layer 328 is further formed on an entire surface of the first substrate 300 on which the color filter 320 and the black matrix 322 have been formed.

The second overcoat layer 328 may be made of an inorganic insulating material such as SiNx or may be made of an organic insulating material such as photo acryl.

In addition, photo acryl is used to overcome the step difference between the color filter and the black matrix and to obtain permittivity. Because the step difference is reduced with an increase in the thickness of color filter resin for excellent color reproduction and the permittivity of the black matrix material is obtained, an SiNx layer with a thin thickness can be used.

Meanwhile, a contact hole is formed to penetrate the first and second overcoat layers 332b and 328.

Next, a pixel electrode 324 contacting with the drain electrode 318 through the contact hole and corresponding to the pixel region is formed on the second overcoat layer 328.

In addition, another black matrix 222 may be simultaneously formed in an outer portion of the first substrate 200, that is, a light leakage region corresponding to the gate link line, while the black matrix 222 and the color filter 220 are formed.

Thereafter, a comb-shaped transparent common electrode 329a is formed to intersect the pixel electrode 324.

Meanwhile, the transparent common electrode 329a and a common electrode 329b simultaneously receive a common signal from a common voltage supply line (not shown) disposed at the outer portion of the panel through a common electrode link.

A second overcoat layer 328 may be simultaneously formed on a black matrix at the outer portion while the second overcoat layer 328 is formed on the black matrix 322 and the color filter 320.

The first overcoat layer 332b and the gate insulating layer 332a are etched so that the drain electrode 318 may come in contact with the pixel electrode 324.

An ESD circuit is formed at the outer portion of the first substrate 300.

The pattern spacer 388 is formed on the ESD circuit to protect the ESD circuit.

Here, the ESD circuit may be formed under the sealant 394, or may be formed inwardly or outwardly from the sealant 394.

Also, the pattern spacer 388 is formed on the gate pad 352 formed outwardly from the sealant 394.

This aims at preventing a galvanic phenomenon from occurring between the gate pad 352 and the gate pad port 353.

The pattern spacer 388 may also be formed on the common electrode link to prevent a galvanic phenomenon thereat.

As described above, the array unit and the color filter layer are formed on the same substrate and the ESD circuit is formed in the outer region of the panel. In addition, the pattern spacer is formed on the ESD circuit, thereby protecting the ESD circuit and preventing an electrical short due to static electricity. Accordingly, product reliability can be improved.

Also, light leakage can be prevented by forming the black matrix in the outer region of the panel.

Furthermore, the outer black matrix of the panel is formed on the substrate on which the array unit and the color filter layer are formed, thereby reducing the thickness of the LCD. Accordingly, the LCD can be reduced in weight and a material cost thereof can be reduced.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An LCD (liquid crystal display device) having a liquid crystal panel including an active region serving as a display region and an outer region serving as a non-display region, the LCD comprising:
    a gate line formed in one direction on a first substrate;
    a gate electrode formed on the first substrate;
    a gate pad formed at the outer region;
    a gate insulating layer formed on the gate line;
    a semiconductor layer formed on the gate insulating layer at a position corresponding to a TFT (thin film transistor);
    a data line intersected by the gate line to define a pixel region;
    source and drain electrodes protruded from the semiconductor layer;
    a black matrix formed on the TFT, the gate line and the data line;
    a color filter formed in the pixel region;
    an overcoat layer formed on the black matrix and the color filter;
    a pixel electrode formed on the overcoat layer to be connected to the drain electrode;
    a transparent common electrode formed to alternate with the pixel electrode;
    an ESD (electrostatic discharge) circuit formed in the outer region;
    a pattern spacer formed on the ESD, the TFT and the gate pad;
    a second substrate facing the first substrate; and
    a sealant for attaching the first and second substrates together.

2. The LCD according to claim 1, wherein the ESD comprises a plurality of TFTs.

3. The LCD according to claim 1, wherein the pattern spacer is formed on a partial surface or an entire surface of the ESD.

4. The LCD according to claim 1, wherein the ESD is formed under the sealant.

5. The LCD according to claim 1, wherein the ESD is formed inwardly from the sealant.

6. The LCD according to claim 1, wherein the ESD is formed outwardly from the sealant.

7. The LCD according to claim 1, wherein a metal common electrode is further formed on the gate line layer near the data line.

8. The LCD according to claim 7, wherein the metal common electrode is connected to the transparent common electrode by a common electrode link.

9. The LCD according to claim 8, wherein a pattern spacer is further formed on the common electrode link region.

10. The LCD according to claim 1, wherein the pixel electrode and the transparent common electrode are made of transparent conductive material.

11. The LCD according to claim 1, wherein an overcoat layer is further formed on the source and drain electrodes.

12. The LCD according to claim 1, wherein a semiconductor layer is further formed beneath the data line.

13. The LCD according to claim 1, wherein the overcoat layer is made of photo acryl or inorganic material.

14. A method for manufacturing an LCD (liquid crystal display device) having a liquid crystal panel including an active region serving as a display region and an outer region serving as a non-display region, the method comprising:
    forming in the active region on a first substrate a gate line, a gate pad, and a data line intersecting the gate line to define a pixel region and forming a TFT (thin film transistor) at an intersection between the gate line and the data line, the TFT including a gate electrode and an active layer and source/drain electrodes;
    forming an ESD (electrostatic discharge) circuit in an outer region of the first substrate;
    forming a black matrix on the TFT, the gate line, the data line and the outer region;
    forming an R/G/B color filter in the pixel region;
    forming an overcoat layer on the color filter;
    forming a pixel electrode and a transparent common electrode on the overcoat layer;
    forming a pattern spacer on the ESD circuit and the gate pad;
    attaching the first substrate and a second substrate facing the first substrate together using a sealant; and
    forming a liquid crystal layer between the first and second substrates.

15. The method according to claim 14, further comprising forming a metal common electrode near the data line during the forming of the gate line.

16. The method according to claim 14, further comprising forming an overcoat layer on the source and drain electrodes.

17. The method according to claim 15, wherein the metal common electrode is connected to the transparent common electrode by a common electrode link.

18. The method according to claim 17, wherein a pattern spacer is further formed on the common electrode link region.

19. The method according to claim 15, wherein the pixel electrode and the transparent common electrode are made of transparent conductive material.

20. The method according to claim 15, wherein the ESD is formed under the sealant.

21. The method according to claim 15, wherein the ESD is formed inwardly from the sealant.

22. The method according to claim 15, wherein the ESD is formed outwardly from the sealant.

* * * * *